United States Patent Office 3,260,114
Patented July 12, 1966

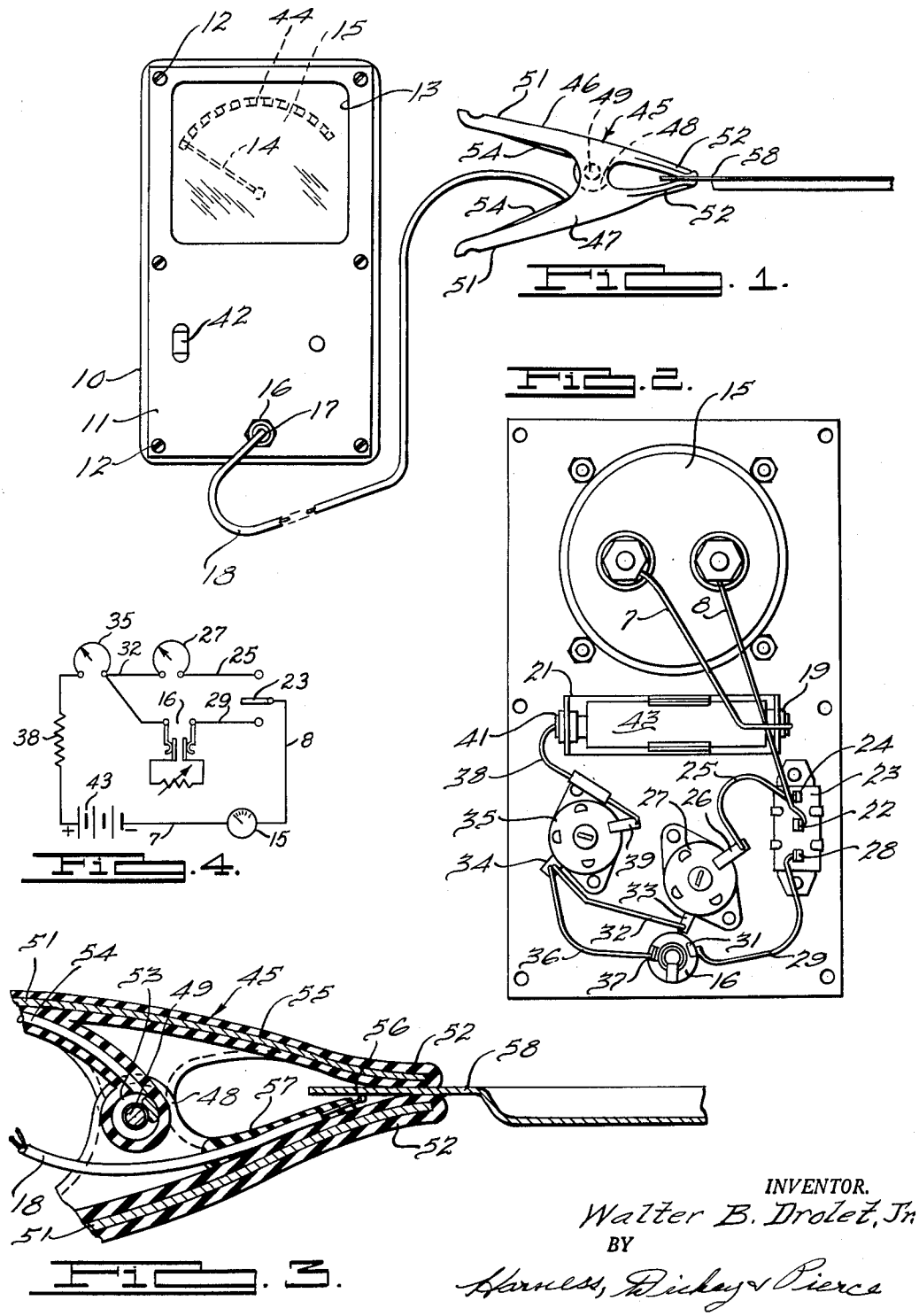

3,260,114
TEMPERATURE INDICATING DEVICE
Walter B. Drolet, Jr., 33027 Allen, Livonia, Mich.
Filed Feb. 19, 1962, Ser. No. 173,966
3 Claims. (Cl. 73—362)

The present invention relates to temperature indicating devices and particularly to a device by which the temperature of moving objects may be taken within a confined area.

While there are many uses for the temperature indicating device in the present invention, reference will be made by way of example, to the use of the device for checking the temperature of dinnerware such as dishes and the like, as they are advanced through a machine where they are washed and sterilized. It is necessary that the dishes be brought to a temperature of at least 160° F. while passing through the washing and sterilizing machine and it was found difficult to accurately check the temperature of the dish during its passage.

The present invention embodies a case provided with resistor elements in series with each other, a battery and a meter from which temperature is directly read. The meter is responsive to the resistance of the circuit when compared to that produced in a parallel circuit which varies with the temperature of the dish. A jack is provided in the circuit of the case to the separable portion of which the ends of a pair of conductors having a pair of leads are secured. The opposite ends of the conductors are attached to a thermistor secured to one end of a spring pressed pair of jaws which are insulated from each other. When the handle ends of the jaws are pressed together the jaws separate for receiving the edge of a dish which is to pass through a washing and sterilizing machine. When the handles are released the jaws are secured to the dish with a thermistor in contact therewith. The conductor from the thermistor enters the case through the jack and connects the thermistor in parallel to the rheostats of the case circuit. The meter is calibrated in temperature so that the temperature of the dish may be directly ascertained. The reading is taken near the end of the passage of the dish through the machine while the dish is at the point in the machine where it will be the hottest. The dish proceeds toward the outlet end of the machine with the spring pressed jaws attached thereto carrying the conductor therewith along with the removed jack portion. The conductor and jack portion then pass through the machine and are removed from the machine with the dish and the jaws.

Accordingly, the main objects of the invention are: to provide a device for indicating the temperature of an element as it is heated and while passing through a washing and/or sterilizing machine; to provide a case having a meter and battery energized circuit thereon with a parallel comparing circuit containing a resistance element responsive to temperature which is attached to spring pressed jaws which retain the element in engagement with the article being heated; to provide a device for measuring the temperature of dinnerware as it is washed and sterilized in its passage through a machine having a resistance element responsive to temperature thereto for passage with a recording element for indicating the temperature of the engaged ware; and in general, to provide a temperature responsive device which is simple in construction, positive in operation, and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken view in elevation of a temperature indicating device embodying the present invention;

FIG. 2 is a view of a circuit and elements thereof employed in the device illustrated in FIG. 1;

FIG. 3 is an enlarged broken sectional view of the clamping element illustrated in FIG. 1 secured to a dish to be heated, and FIG. 4 is a view of a circuit diagram employed in the device of FIG. 1.

The device in the present invention embodies a case 10 having a cover 11 thereon secured in position by a plurality of screws 12. The cover has a transparent opening 13 in which an indicating hand 14 of a meter 15 is visible. A jack 16 is secured to the cover 11 having a removable portion 17 which is attached to a pair of leads in the conductor 18 in the conventional manner. A conductor 7 connects one terminal of the meter 15 to a terminal end 19 of a battery supporting clip 21. A conductor 8 connects the other terminal of the meter 15 to a central terminal 22 of a single pole double throw switch 23 located centrally of two end terminals 24 and 28. The end terminal 24 of the switch is connected by conductors 25 to a terminal 26 of a rheostat 27 which may have a rating of 1500 ohms. The end terminal 28 of the switch 23 is connected by a conductor 29 to a terminal 31 of the jack 16. A conductor 32 is connected to a terminal 33 of the rheostat 27 and to a terminal 34 of a rheostat 35 which is of 500 ohm capacity. A conductor 36 connects the terminal 34 of the rheostat 35 to a terminal 37 of the jack 16. A resistor 38 of approximately 270 ohms connects a terminal 39 of the rheostat 35 to a terminal 41 of the battery supporting clip 21.

A battery 43 is supported in the clip with the ends conductively joined to the circuit through the terminals 19 and 41 of the clip. It will be noted that the switch has an "off" and two "on" positions and has the jack 16 disposed in series with rheostat 35 when taking a temperature reading. The rheostats are adjustable so that the circuit may be balanced relative to the resistance of the circuit containing the jack 16 to calibrate the device when the switch is in one position and to take a temperature reading when in the other position. A switch button 42 on the front of the cover permits the switch to be moved to "off" and the two "on" positions and the indications 44 on the meter read directly in degrees from approximately 150 to 170° when the meter is employed for the purpose of checking the temperature of 160°.

In FIG. 3, a spring clamp 45 is illustrated which is clampable on to a dish to be carried thereby through the washing and sterilizing machine. The jaws are made from two like parts having nesting bosses 48 containing apertures through which a rivet 49 extends for retaining the two halves in pivotal relationship to each other. The element 45 has two handle portions 51 and jaw portions 52 at opposite ends from the rivet 49. A coil spring 53 about the rivet 49 has a pair of arms 54 extending therefrom in engagement with the underside of the handle portions 51 for urging them apart. A thick coating of plastic material 55 is provided over the assembly. A thermistor 56 is attached to the leads of the conductor 18 and is secured to the inner surface of one of the jaws by an epoxy resin or other securing means 57. The thermistor 56 is of the well known type, the resistance of which varies with temperature and is supported to engage a dish or other articles which is clamped by the jaw so as to be in direct contact therewith and to have the same temperature as the dish 58. As the temperature of the plate 58 rises the resistance of the thermistor 56 rises therewith and this resistance taking place of the resistance of the rheostat 27 with which the circuit was calibrated, produces a reading on the meter when the temperature of the dish approaches 160°.

To check a plate or other article being washed and/or sterilized, the article is clamped by the jaws 52 of the clamping element 45 so as to be carried thereby with the thermistor 56 in engagement therewith. As the dish or article moves through the machine a reading may be taken of the maximum temperature to which the dish or article had been raised. Thereafter, the removable portion 17 of the jack 16 is separated from the fixed body portion thereof so that the entire conductor 18 and the jack portion 17 may travel through the machine with the article or dish on which the clamping element 45 is attached. The spring clamp 45, the conductor 18 and the jack portion 17 will be removed from the outlet end of the machine along with the article on which the clamp is secured. It is to be understood that in place of the meter 15, a recording device may be employed connected to the conductors 7 and 8 so that a permanent record may be had of the temperature of the dish or article being washed and/or sterilized through its travel through the machine. The switch 23 is so constructed that in "off" position the conductors 25 and 29 are disconnected from each other and the conductor 8, and when in one "on" position the conductors 8 and 29 are connected together to obtain a temperature reading and when in the other "on" position conductors 8 and 25 are secured together to calibrate the circuit.

What is claimed is:

1. In a device for checking the temperature of an article, a circuit comprising temperature indicating means, power means, resistance means, first and second rheostat means and switch means completing a series circuit in the order named, a second circuit in parallel with said second rheostat means of the first said circuit and in series with said first rheostat means and said switch means, said second circuit comprising a separable jack, a conductor having a pair of leads with one end being connected to the separable part of the jack, a thermistor joined to the other ends of said leads, clamping means supporting said thermistor and retaining it in engagement with an article to be tested, and insulating means covering the portions of said clamping means engageable with the article to be tested, said thermistor being located externally of said insulating means at a position to contact the article when the article is engaged by said clamping means.

2. In a device for checking the temperature of an article, a circuit comprising a temperature indicating element, a source of power, a resistor, a first and second rheostat and a switch disposed in series relation, a second circuit having the fixed part of a jack therein disposed in parallel relation with the second rheostat of the first said circuit when connected in series to said first rheostat and switch, a conductor having a pair of leads with one end connected to the removable part of the jack, a thermistor joined to the other ends of said leads, said second rheostat being adjusted to have its resistance varied relative to that of the thermistor at a desired temperature to be indicated, means for clamping the thermistor in engagement with an article to be tested and comprising movable jaw means and spring means urging said jaw means together, and an insulating material covering said jaw means, said thermistor being located externally of said insulating material at a position to contact the article to be tested when the article is clamped between said jaw means.

3. In a device for checking the temperature of an article, a case, a cover on said case, a meter in said case having an indicating end visible through the front thereof, a circuit embodying electrical potential means, a resistor, a first and second rheostat and a switch disposed in parallel with said second rheostat and connected in series with said first rheostat and said switch, a thermistor connected in series with said second circuit, clamping means for securing said thermistor in contact with an article to be tested for a temperature registered on said meter when the resistance of said thermistor reaches a predetermined relation to the resistance of said second rheostat, the latter having been adjusted to provide a relationship to produce a true temperature reading, said clamping means comprising a pair of spring pressed jaws having handle portions, a pivot between said jaws and said handle portions, spring means for urging said handle portions apart to urge said jaws together, and an insulating material covering the entire area of said jaws, said thermistor being located externally of said insulating material in a position to contact an article to be tested when the article is clamped between said jaws.

References Cited by the Examiner

UNITED STATES PATENTS

| 2,136,055 | 11/1938 | Miller | 73—359 |
| 2,141,759 | 12/1938 | Moffat | 73—343 |
| 2,177,837 | 10/1939 | Miller | 73—359 |
| 2,399,674 | 5/1946 | Harrison | 324—106 |
| 2,890,429 | 6/1959 | Baker | 73—362 |
| 2,919,580 | 1/1960 | McConnell | 73—362 |
| 2,970,475 | 2/1961 | Werner | 73—349 |

FOREIGN PATENTS

| 863,913 | 4/1941 | France. |
| 863,896 | 3/1961 | Great Britain. |

OTHER REFERENCES

Lawson, T. C.: A Circuit for the Humistor. Application Lab Report #564, November 1958, Lansdale Tube Company, Lansdale, Pennsylvania (pages 1–6 relied on).

ISAAC LISANN, *Primary Examiner.*

S. H. BAZERMAN, J. H. BARKSDALE,
*Assistant Examiners.*